United States Patent [19]

Salter

[11] Patent Number: 4,627,593
[45] Date of Patent: Dec. 9, 1986

[54] PIPE SUPPORTS

[76] Inventor: Anthony J. Salter, Cherry Trees, The Ridgeway, Sedgley, Dudley, West Midlands, DY3 1BS, England

[21] Appl. No.: 666,975

[22] Filed: Oct. 31, 1984

[30] Foreign Application Priority Data

Nov. 5, 1983 [GB] United Kingdom ............... 8329632

[51] Int. Cl.$^4$ .......................................... F16M 13/00
[52] U.S. Cl. .................................... 248/561; 248/58; 248/613
[58] Field of Search .................... 248/561, 59, 60, 62, 248/58, 575, 578, 543, 613

[56] References Cited

U.S. PATENT DOCUMENTS

| 415,689 | 11/1889 | Williams | 248/60 |
|---|---|---|---|
| 2,372,214 | 3/1945 | Loepsinger | 248/59 X |
| 2,979,297 | 4/1961 | Suozzo | 248/575 X |
| 3,429,545 | 2/1969 | Michel | 248/561 X |
| 4,023,756 | 5/1977 | Baker | 248/59 |
| 4,069,992 | 1/1978 | Lada | 248/59 X |
| 4,083,522 | 4/1978 | Vandership | 248/59 |
| 4,238,102 | 12/1980 | Salter | 248/543 |

FOREIGN PATENT DOCUMENTS

| 3026319 | 2/1982 | Fed. Rep. of Germany | 248/561 |
|---|---|---|---|
| 867215 | 5/1961 | United Kingdom | 248/60 |
| 991684 | 5/1965 | United Kingdom | 248/58 |
| 1408825 | 10/1975 | United Kingdom | . |

Primary Examiner—J. Franklin Foss
Assistant Examiner—David L. Talbott
Attorney, Agent, or Firm—Sand & Hudak Co.

[57] ABSTRACT

In the body of a pipe support a piston supported on a compression spring is movable relative to the body. A turnbuckle suspended from the piston passes down out of the body and, in use, is connected to a pipe to be supported. The body and the piston have adjacent each other oppositely inclined slots. The piston may be clamped to the body by a lock nut and a lock washer which are interconnected through registering portions of the slots by a bolt. The bolt can be slackened off to allow the nut and washer to slide in the slots so that the piston can move freely in the body. The oppositely inclined slots allow the piston to be clamped to the body at any position within its range of movement.

14 Claims, 4 Drawing Figures

PIPE SUPPORTS

This invention relates to pipe supports of the kind comprising a body, spring means located by the body, a piston upon which the spring means acts and which is movable relative to the body and carrier means connected to the piston adapted to be engaged with a pipe to be supported. Such pipe supports are hereinafter referred to as "of the kind set forth".

Pipe supports of the kind set forth are used to support pipes which are subject to movement in use caused, for example, by variations in temperature. Pipes for conveying steam are usually supported by such pipe supports. The pipe supports may be of the constant tension type in which the spring means acting through the piston provides a substantially constant supporting force over a predetermined range of movement of a supported pipe, or the pipe supports may be of the variable spring type in which the supporting force provided by the spring means varies with movement of a supported pipe.

It is desirable for the pipe supports to include provision for locking the spring means temporarily against movement, for example prior to and during fitting of the pipe supports for use or whilst cleaning or maintenance is carried out on the pipes which they support.

It is an object of the present invention to provide a pipe support in which locking of the spring means is facilitated.

According to one aspect of the present invention there is provided a pipe support of the kind set forth wherein part of the body has a first slot inclined with respect to the direction of movement of the piston and the piston has adjacent to the body part a second slot which is oppositely inclined to the first slot, the arrangement of the slots being such that portions of them are in register within the range of movement of the piston, and locking means comprising clamping members interconnected through the registering portions of the slots for clamping the piston to the body part to restrain movement of the piston, the clamping members being releasable to allow the piston to move relative to the body.

When it is operative the locking means preferably has bearing engagement with edges of the slots which lie in intersecting planes so that there are forces acting between the body part and locking means, and the locking means and piston, having components which oppose movement of the piston. This in combination with the clamping action of the locking means provides secure retention of the piston against movement relative to the body.

The portions of the slots which are in register alter according to the position of the piston relative to the body within its range of movement. Ideally there are portions of the slots in register throughout the full range of movement of the piston so that the piston can be clamped to the body to restrain it from movement at any position in the range.

When released the clamping members of the locking means may be detachable from the body part and piston. The clamping members may be arranged to be released without being detached from the body part and the piston to allow the piston to move relative to the body part. The latter arrangement requries only the operation of tightening the clamping members to clamp the piston to the body part, rather than applying them to the slots and then tightening, and so the locking of the piston and spring means can be quickly and easily effected.

The locking means preferably comprises a pair of mating screw-threaded members. Either or both of the screw-threaded members may or may not constitute a clamping member which engages directly with a surface of the body part or piston adjacent to the first or second slot. The screw-threaded members may be adapted to lock when they are tightened so that they cannot become loose inadvertently. They may lock in any suitable manner, for example by means of a locking thread form or a locking patch in the thread of the internally screw-threaded member.

When one or each one of the screw threaded members does not constitute a clamping member at least one of the clamping members may comprise a washer. Preferably the or each clamping member has a serrated or otherwise suitably roughened face which engages with the surface of the body part or piston, as the case may be, to enhance the frictional engagement.

Generally it will be convenient for the slots to be disposed at 90° to one another and at 45° to the direction of movement of the piston. This presents a balanced combination of free movement of the locking means relative to the slots when the clamping members are released, and secure retention of the piston when it is clamped to the body part by the clamping members. However, the slots may be aligned at steeper or shallower angles, although they should be similarly inclined to the direction of movement of the piston. A steeper angle of the slots, that is with the slots disposed closer to the direction of movement of the piston, may be appropriate when the piston is required to have a relatively large range of movement during use of the pipe support, and a shallower angle may be appropriate when the piston is to have a relatively small range of movement in use.

The body and piston may have more than one associated pair of first and second slots spaced at intervals around a central axis that is parallel to the direction of movement of the piston, each associated pair of first and second slots having its own independently operating locking means. Preferably, the body and piston each have two slots at diametrically opposite sides of the central axis.

The body may be a closed or substantially closed structure such that it encases the piston and the spring means. Alternatively, it may be an open structure that leaves the piston and/or the spring means at least partially exposed. It may be tubular, or notionally tubular, of circular or non-circular cross-section.

The piston may have a skirt extending around the spring means in which the or each second slot is formed. The skirt may be continuous or segmented. Alternatively the or each second slot may be in a plate, flange or analogous part formed on or attached to the piston.

As a means of facilitating manufacture and reducing the cost of manufacture the body and piston may be made at least in part of similarly sectioned components. For example, in an embodiment in which the body is tubular and the piston has a skirt, the side walls of the body and the skirt may comprise assemblies of components of similar arcuate or angled sections. The sections may, for example, be extrusions. The components may be similarly formed with slots to provide the first and second slots in the assembled body and piston.

It is usual in pipe supports of the kind set forth for the spring means to comprise a helical compression spring or two or more such springs arranged co-axially or end to end. The spring means of the pipe support in accordance with the invention may comprise one or more helical compression springs. When such a spring or springs are used it is advantageous to lock the or each spring in a compressed state with respect to the body for some time before the pipe support is installed for use so as to inhibit relaxation of the spring subsequently when the pipe support is in use.

For use in the manufacture of a pipe support in accordance with the first aspect of the invention, for repair purposes, or for enabling an existing pipe support to be modified to be in accordance with the first aspect of the invention, there is provided in accordance with a second aspect of the invention a spring assembly which comprises the body having the part in which is the first slot, the piston upon which the spring means acts and which is adapted to be connected to carrier means for supporting a pipe and has the second slot, and the locking means comprising the clamping members interconnected through the registering portions of the slots.

An embodiment of the invention will now be described by way of example with reference to the accompanying drawings in which.

Figure 1:
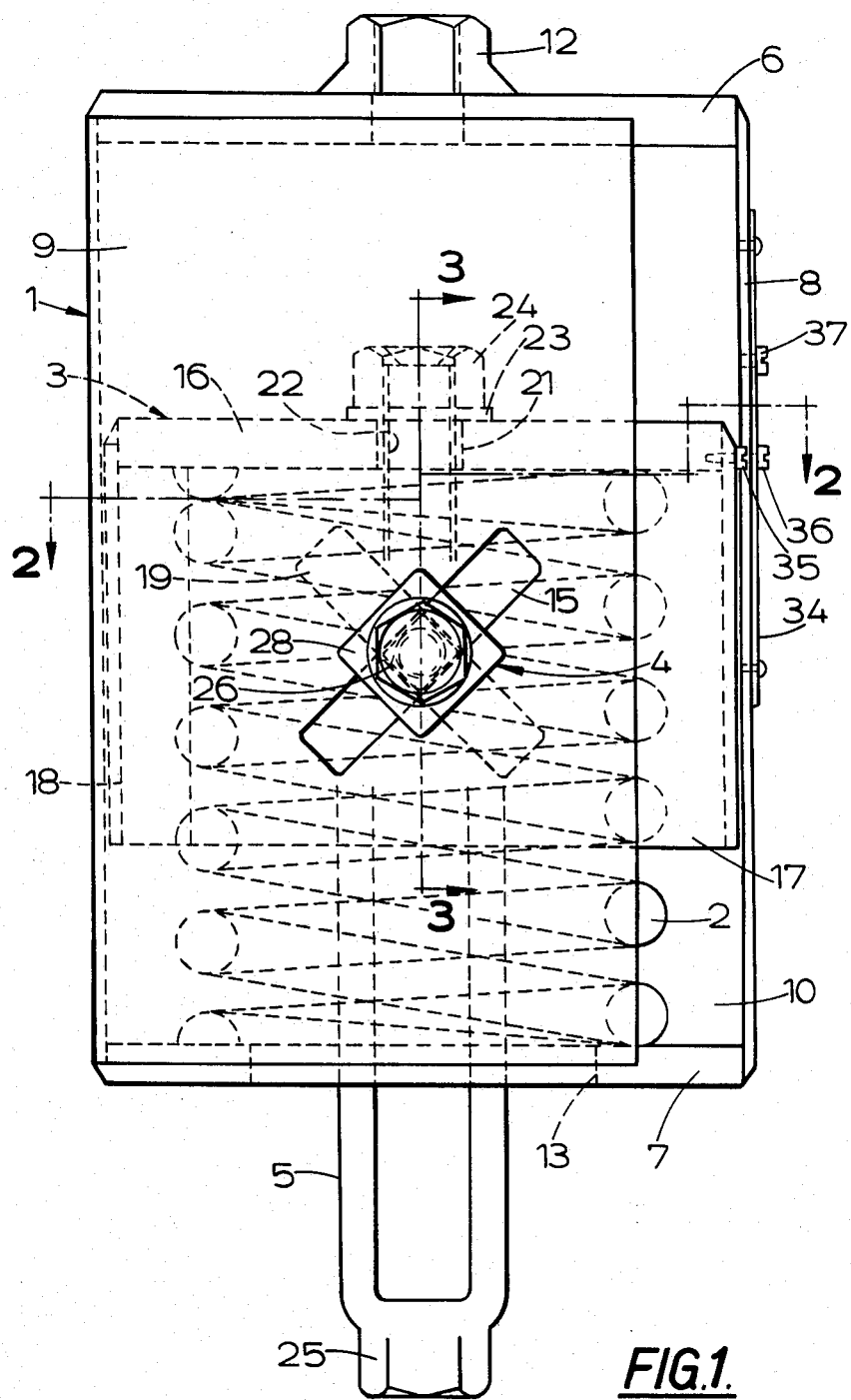
FIG. 1 is a side view of a pipe support in accordance with the present invention.
Figure 2:
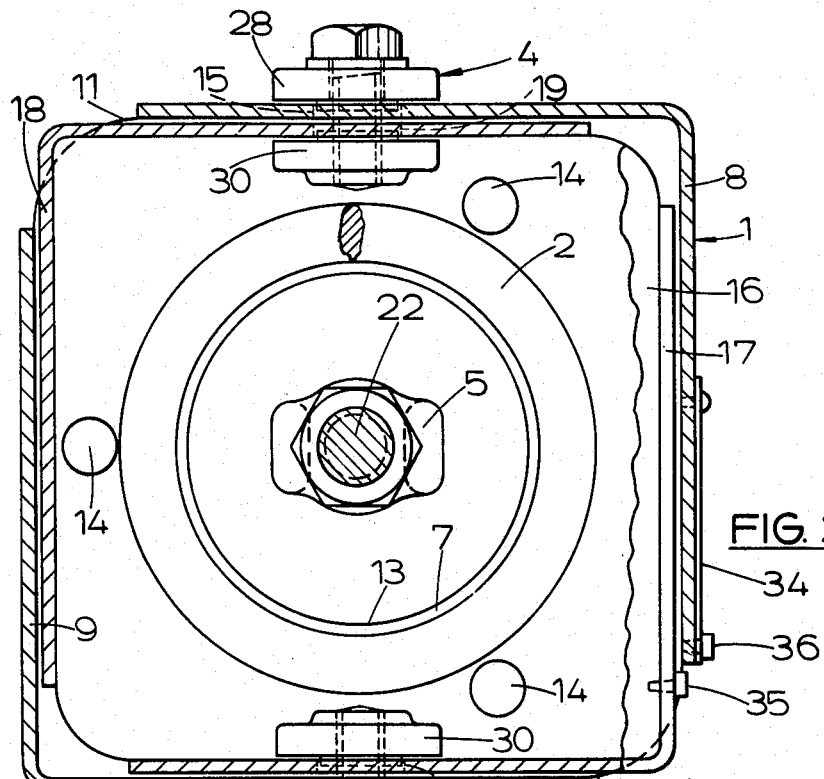
FIG. 2 is a section on line 2—2 of FIG. 1.
Figure 3:
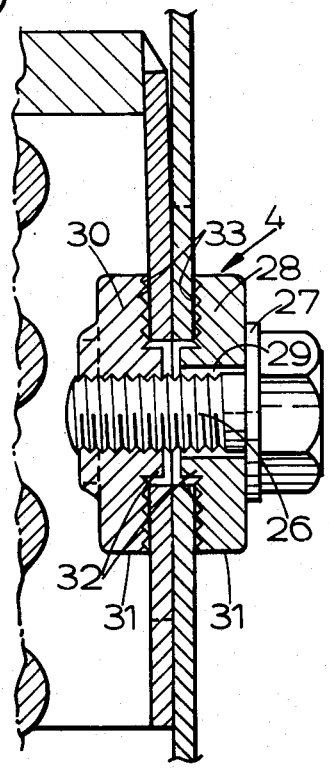
FIG. 3 is a section on line 3—3 of FIG. 1.

Referring to FIGS. 1 to 3 of the drawings, the pipe support, which is of the variable spring type, comprises a body 1 of vertically elongated, box form, a helical compression spring 2 in the body extending co-axially of the central vertical axis of the body, a piston 3 supported on the spring in the body for movement with the spring relative to the body, locking means 4 adapted to lock the piston to the body to restrain the spring from movement relative to the body, and a turnbuckle 5 connected to the piston.

The body is of square horizontal section and comprises square top and bottom plates 6 and 7 respectively and two opposed, angle-section, side plates 8, 9 welded at their ends to the top and bottom plates such that each side plate forms two adjacent side walls of the body, FIG. 2. Adjacent free edges of the two side plates do not meet so that the square-section of the body is not completely closed, two gaps 10, 11 being left at diagonally opposite corners of the body extending between the top and bottom plates. As shown in FIG. 1, the top plate 6 has an attachment nut 12 secured centrally on its upper surface for attaching the body to a suspension fitting, not shown, for suspending the pipe support in position for use. Alternatively the top plate may be provided with an eye or one or more lugs for attachment to a suspension fitting, or be provided with other suitable attachment means. The bottom plate 7 has a central, large diameter, opening 13 in it through which the turnbuckle 5 passes out of the body. The spring 2 seats on the bottom plate. Angularly spaced studs 14 fixed to the bottom plate locate the spring centrally on the plate. Each of the side plates 8, 9 has a closed-ended slot 15 formed in one of its flanges, the arrangement being such that the slots of the two side plates are in two opposed side walls of the body at the upper halves thereof and are directly opposite one another centrally of the widths of the sides of the body. The slots 15 are inclined at 45° to the vertical in the same direction circumferentially of the body.

The piston 3 is of square-section, inverted cup form and is a free sliding fit in the body, which guides the piston in its movement with the spring. It has a square crown plate 16 and two angle-section skirt plates 17, 18 welded to the edges of the crown plate so that each skirt plate forms two adjacent sides of the skirt of the piston. The skirt plates 17, 18 are formed from similar angled sections to the side plates 8, 9 of the body, and each is similarly formed with a closed-ended slot 19 in one of its flanges. The slots 19 are of the same lengths and widths as the slots 15 in the side plates, and are inclined at 45° to the vertical in the same direction circumferentially of the piston but in the opposite directions to the slots 15 in the body part. The piston is assembled in the body with the slots 19 of the piston opposite the slots 15 of the body, the adjacent slots extending at right angles to one another, as seen in FIG. 1. As with the side plates, the adjacent free edges of the two skirt plates do not meet so that the square-section of the piston's skirt is not completely closed, FIG. 3. The crown plate 16 seats on the spring 2. Studs, not shown, fixed to the underside of the crown plate at angularly spaced positions locate the spring centrally of the piston. There is a central hole 21 in the crown plate.

Free, guided movement of the piston in the body may be ensured by diagonally opposite pairs of rollers (not shown) mounted at opposite corners of the piston, the rollers running along the adjacent corners of the body in the angles of the side plates 8 and 9. The rollers may be, for instance, rotatably supported in U-section brackets fixed to the skirt plates 17 and 18 of the piston.

Instead of rollers, the piston and body may possibly have co-operating surfaces of a low frictional resistance, provided for example by polytetrafluoroethylene, which allow the piston to move freely in the body.

It will be appreciated that the side plates 8, 9 and the skirt plates 17, 18 can be cut from a common stock of angle-section material, and may be processed in the same way for the forming of the slots. The only difference is the lengths to which they are cut.

The turnbuckle 5 is suspended from the crown plate 16 of the piston by screw-threaded piston rod 22 which passes up through the central hole 21 and is fitted with a washer 23 and retaining nut 24. At its lower end the turnbuckle 5 has an integral hexagonal nut 25 by means of which it is connected to the pipe which is to be supported by the pipe support when installed for use. The hole 21 in the crown plate and the large diameter opening 13 in the bottom plate 7 of the body allow some swinging movement of the turnbuckle relative to the piston, which is desirable to accommodate any misalignment when the pipe support is in use.

Movement of a supported pipe is accommodated by the spring 2 in the usual way. The piston moves with the spring in the body and as it moves the slots 19 in its skirt plates 17, 18 move vertically relative to the slots 15 in the side plates 8, 9 of the body. The lengths of the slots are such that throughout the range of movement required of the piston in the body, portions of the slots of the piston are in register with portions of the slots of the body, the portions varying according to the positions along their lengths at which the slots intersect. In the mean position of the piston during use the slots should ideally intersect at the mid-points of their lengths.

The locking means 4 comprises in association with each adjacent pair of slots, FIG. 3, a bolt 26 fitted with a plain washer 27 next to its head, a lock washer 28 having a plain central hole 29 through which the shank of the bolt freely passes, and a lock nut 30 with which the bolt is threadedly engaged. The lock washer 28 and lock nut 30 are located respectively outside the body and inside the piston such that on tightening the bolt in the nut the lock washer and lock nut act to clamp the piston to the body to prevent the spring from moving. They are basically similar in that they each have a square main portion 31 and a central short, square spigot portion 32. The sides of the spigot 32 are dimensioned for the spigot to be freely slidable in the slots of the body or the piston, as the case may be, when the bolt is slackened in the lock nut, whilst being restrained from turning in the slot. Bearing surfaces 33 of the main portions 31 which overlap the surfaces of the body and piston adjacent to the slots are serrated to increase the frictional contact between the lock washer and body and between the lock nut and piston when the bolt is tightened. The lock nut 30 has a thread which is adapted in known manner to lock the bolt against turning when it is tightened.

Instead of being square the main and spigot portions of the lock washer and lock nut may be cylindrical although the square form is preferred for ease of tightening and releasing the bolt.

The piston may be clamped to the body to restrain the spring from movement in the body at any position within its range of movement in the body. The piston can move freely in the body when the locking means is released.

A scale 34 is fixed to one of the side plates 8, of the body alongside one of the gaps 10, being calibrated to show deflection of the spring under a range of loads applied to the spring in use by a supported pipe. An indicator 35 in the form of a screw is secured to the side of the piston adjacent to the crown plate to move in the gap 10 alongside the scale 34 and indicate by its kerf the extent of deflection of the spring. Similar screws 36 and 37 are secured to the side plate 8 on the scale to mark by their kerfs initial hot and cold load settings respectively for a supported pipe. As mentioned, the piston is guided in its movement by the body, but also the body prevents the piston from becoming askew in the body so that true readings of movement of a supported pipe are indicated on the scale 34 at all times.

The piston need not necessarily have a skirt as described. It may, for example, simply have two straight plates depending from opposite sides of the crown plate and formed with the slots 19.

Figure 4:
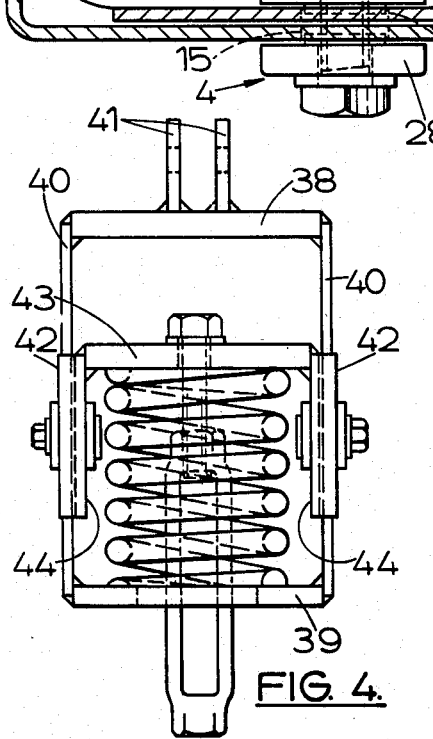
FIG. 4 is a side view showing a modification.

In the modification shown in FIG. 4 of the accompanying drawings, the body is of an open construction. It comprises square top and bottom plates 38, 39 as before but instead of angle-section side plates, plain straight side plates 40 are welded between the top and bottom plates at just two opposite sides of the body. The inclined slots, not shown, are formed in those side plates. The other two sides of the body are left open so that the spring is exposed there. As illustrated the body has a pair of suspension lugs 41 on its top plate but other means for suspending the body may be provided, if preferred. The piston has two depending plates 42 of shallow channel section welded to its crown plate 43 and positioned one adjacent each of the body side plates 40. Side flanges 44 of the depending plates 42 extend vertically and project outwards past the opposite side edges of the respective side plates, thereby to serve to guide the piston in its movement with the spring relative to the body and to restrain the piston from becoming askew in the body. Locking means of the form described above operates between each side plate and the respective depending plate at their slots.

As an alternative to the welded construction just described, the body may have its bottom plate, or possibly its top plate, and side plates formed integrally from one length of plate, and the top plate, or the bottom plate as the case may be, may have flanges to which the ends of the side plates are bolted or rivetted. Suspension lugs may be formed integrally with the top plate. The depending plates of the piston may also be formed integrally with the crown plate. Added rigidity may be afforded the crown plate, if necessary, by pressing side flanges out of the plate.

It will be understood that the components of the body and/or piston of the embodiment described with reference to FIGS. 1 to 3 of the drawings may be adapted to be bolted or rivetted together instead of being welded together.

Where the body has a pressed top plate it may be necessary to reinforce it for suspension of the body. This may be done by securing a further plate to it. As a means of saving material, such a reinforcing plate may be provided by the part of the bottom plate which is cut out to leave the large diameter opening for the turnbuckle to pass through.

For some installations in which there is likely to be appreciable lateral movement of the supported pipe, the piston rod of the turnbuckle may be fitted with a rocker above the crown plate of the piston to aid the movement of the turnbuckle relative to the piston. The piston rod may extend well above the crown plate and be fitted with a sleeve which has a rocker piece at its lower end for engagement with the crown plate. In such an arrangement the extended piston rod may project out from the body through a large diameter opening in the top plate.

In the embodiment and modifications described above the pipe support is adapted to be suspended for use. The pipe support may be constructed to support a pipe from below. Thus the body may have its bottom plate replaced by a base plate on which the body stands, and instead of the turnbuckle a load plate may be supported by the piston above the body. Preferably the load plate is adjustable for height above the piston. A tube may be mounted co-axially on the crown plate of the piston and project out of the body through a clearance hole in the top plate of the body, and the load plate may be mounted co-axially on a screw which extends telescopically down into the tube and is fitted with an adjusting nut which bears through a washer on the upper end of the tube. Apart from these modifications the construction of the pipe support may be substantially as described above with similar locking means between the body and piston.

Pairs of pipe supports in accordance with the invention may be connected in tandem for supporting pipes, if required.

I claim:

1. A pipe support comprising a body, spring means located by said body, a piston upon which said spring means acts and which is axially movable relative to said body, carrier means connected to said piston adapted to be engaged with a pipe to be supported, and locking means for locking said piston against movement relative to said body, said body having an axially extending part that has a first slot inclined with respect to the direction of movement of said piston, said piston comprising a crown plate which provides a seating for the spring means and an axially extending part which extends axially from the crown plate and which co-operates with said axially extending body part to guide said piston in its axial movement relative to said body, said axially extending piston part having adjacent to said axially extending body part a second slot which is oppositely inclined to said first slot, said first and second slots being so arranged as to have portions in register within the range of movement of said piston, and said locking means including clamping members interconnected through said registering portions of said slots and adapted to clamp said piston to said body part to retrain movement of said piston, said clamping members being releasable to allow said piston to move relative to said body.

2. The pipe support according to claim 1 wherein said first and second slots have edges which lie in intersecting planes, and said clamping members have bearing portions which engage with said edges of said slots to oppose movement of said piston when said piston is clamped to said body part.

3. The pipe support according to claim 1 wherein said clamping members are detachable from said body part and said piston.

4. The pipe support according to claim 1 wherein said clamping members have spigot portions which are slidable in said slots when said clamping members are released whereby said piston is allowed to move relative to said body without said clamping members being detached from said body part and said piston.

5. The pipe support according to claim 1 wherein at least one of said clamping members comprises a washer engageable with said body part around said first slot or said piston around said second slot.

6. The pipe support according to claim 1 wherein said locking means comprises a pair of mating screw threaded members which are tightenable to clamp said piston to said body part.

7. A pipe support according to claim 1 wherein said first and second slots are disposed substantially at 90° to each other and at 45° to the direction of movement of said piston.

8. A pipe support according to claim 1 wherein said body has a first end plate which locates said spring means and a second end plate opposite said first end plate, said axially extending body part which has said first slot comprising a side plate which connects said first and second end plates.

9. A pipe support according to claim 8 wherein said axially extending part of said piston which has said second slot comprises a plate which is formed on or secured to said crown plate and which co-operates with said side plate of said body to guide said piston in its axial movement relative to the body.

10. A pipe support according to claim 1 wherein said axially extending piston part comprises a skirt which extends around said spring means, said skirt being formed with said second slot.

11. A pipe support comprising a body, spring means located by said body, a piston upon which said spring means acts and which is axially movable relative to said body, carrier means connected to said piston adapted to be engaged with a pipe to be supported, said body having one or more axially extending part or parts in which there is provided a plurality of first slots which are spaced at intervals around a central axis that is parallel to the direction of movement of said piston and which are inclined with respect to said direction of movement, said piston comprising a crown plate which provides a seating for said spring means and one or more axially extending piston parts extending axially from the crown plate, said axially extending part or parts of said body and of said piston cooperating together to guide said piston in its axial movement relative to said body, there being provided in said axially extending piston part or parts a plurality of second slots each of which is adjacent to an associated one of said first slots and is oppositely inclined to said associated first slot, each associated pair of first and second slots being so arranged as to have portions in register within the range of movement of said piston and having its own independently operated locking means, each of said independently operated locking means including clamping members interconnected through said registering portions of the associated pair of first and second slots and adapted to clamp said piston to said body part or parts to retrain movement of said piston, said clamping members being releasable to allow said piston to move relative to said body.

12. A pipe support according to claim 11 wherein the body and piston have two associated pairs of first and second slots at opposite sides of the body.

13. A pipe support according to claim 11 wherein said body has an axially extending body part which is of tubular form and said piston has a single axially extending piston part comprising a skirt which extends around said spring means and which co-operates with said tubular body part to guide said piston in its axial movement.

14. A pipe support according to claim 12 wherein said body has a first end plate which locates said spring means, a second end plate opposite said first end plate and two opposed axially extending side plates which connect said first and second end plates, each of said side plates being provided with one of said first slots, and said piston has two opposed plates extending axially from said crown plate, each of said axially extending piston plates being adjacent a respective one of said side plates and being provided with one of said second slots.

* * * * *